(12) United States Patent
Abe et al.

(10) Patent No.: US 6,693,889 B1
(45) Date of Patent: Feb. 17, 2004

(54) TRANSMISSION AND RECEPTION SYSTEM, TRANSMISSION AND RECEPTION DEVICE, AND METHOD OF TRANSMISSION AND RECEPTION

(75) Inventors: Katsuaki Abe, Kanagawa (JP); Makoto Hasegawa, Tokyo (JP); Naoyuki Yamamoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/335,315

(22) Filed: Jun. 16, 1999

(30) Foreign Application Priority Data

Jun. 16, 1998 (JP) .......................... 10-167868

(51) Int. Cl.$^7$ ............................... H04B 7/216
(52) U.S. Cl. .................. 370/342; 370/335; 375/347; 714/790
(58) Field of Search ................ 370/342, 286, 370/326, 335; 375/146–8, 260, 262, 347; 714/752, 746, 790

(56) References Cited

U.S. PATENT DOCUMENTS 5,907,582 A * 5/1999 Yi ........................ 370/342 X
6,131,180 A * 10/2000 Ramesh .................... 714/790

FOREIGN PATENT DOCUMENTS

| JP | 08298466 A | 11/1996 | |
| WO | WO 9750218 A1 * | 12/1997 | H04L/27/34 |

OTHER PUBLICATIONS

S. Kallel, "Complementary Punctured Convolutional (CPC) Codes and Their Applications", IEEE Transactions on Communications, vol. 43, No. 6, pp. 2005–2009 (Jun. 1995).

* cited by examiner

Primary Examiner—Nay Maung
Assistant Examiner—Philip J. Sobutka
(74) Attorney, Agent, or Firm—RatnerPrestia

(57) ABSTRACT

A transmission and reception system utilizes primarily a combination of punctured-convolution-coding and diversity. Degradation in likelihood of certain data is prevented by adopting the steps of (a) punctured-convolution-coding series of identical information data by using a plurality of different puncturing patterns, (b) diversity-transmitting each of different series of punctured data obtained in step (a) as diversity branches, (c) depuncturing the series of punctured data individually in a receiving device by using identical puncturing patterns and as used in the transmission side, and (d) combining and convolution-decoding them thereafter.

2 Claims, 8 Drawing Sheets

TRANSMISSION AND RECEPTION SYSTEM, TRANSMISSION AND RECEPTION DEVICE, AND METHOD OF TRANSMISSION AND RECEPTION

FIELD OF THE INVENTION

The present invention relates to a digital wireless transmission and reception system, a transmission and reception device, and a method of transmission and reception, in which quality of communication is improved.

BACKGROUND OF THE INVENTION

There are a number of methods for improving quality of communication in the digital wireless transmission such as an error-correction coding, a diversity transmission and reception, and a combination of them. A well-known method of error-correction coding among the above is a convolution coding having a superior -performance in the error correction. One example is a newly devised method which combines interleaving and puncturing with the convolution coding, as disclosed in Japanese Patent Laid-Open Publication No. H08-298466. A method of the prior art for improving quality of communication using a combination of the convolution coding, the puncturing and the time-diversity will be briefly described by referring to FIGS. 8A and 8B.

In a transmission device 800 of FIG. 8A, a series of information data 851 to be transmitted is punctured (thinning-out process) in a unit of a fixed amount of data block by a puncturing unit 802 in order to reduce an amount of communication traffic in a transmission pathway, after it is convolution-coded by a convolutional coding unit 801. A puncturing (thinning-out) location within the data block is stored as a puncturing pattern in a puncturing pattern generator 803, from where it is supplied to the puncturing unit 802.

An example shown in FIG. 8B will be described now in detail. A series of input information data $\{a_0, b_0, c_0, d_0 \ldots\}$ is converted into a series of convolution-coded data $\{a_1, a_2, b_1, b_2, c_1, C_2, d_1, d_2, \ldots\}$ by the convolutional coding unit 801 having a constraint length of 3 and a coding rate of 1/2. The puncturing unit 802 removes $b_2, d_1$, etc., and outputs a series of punctured data $\{a_1, a_2, b_1, c_1, C_2, d_2, \ldots\}$, when a puncturing pattern 803b is supplied from the puncturing pattern generator 803. This series of punctured data is a combination of a series of data $\{a_1, b_1, c_1, e_1, \ldots\}$, which is obtained by deleting data corresponding to $a_0$ position in an upper row of the puncturing pattern 803b from a series of data $\{a_1, b_1, c_1, d_1, e_1, \ldots\}$ corresponding to the upper row of the puncturing pattern 803b out of the foregoing series of convolution-coded data, and another series of data $\{a_2, c_2, d_2, e_2, \ldots\}$, which is obtained by deleting data corresponding to $a_0$ position in a lower row of the puncturing pattern 803b from a series of data $\{a_2, b_2, c_2, d_2, e_2, \ldots\}$ corresponding to the lower row of the puncturing pattern 803b out of the series of convolution-coded data.

A time-diversity modulator/transmitter 804 repeats modulation and transmission of the series of punctured data for a predetermined number of times in response to a diversity transmission timing control signal supplied by a diversity transmission timing controller 805 at intervals of a predetermined time.

In a receiving device 810, the predetermined time for the transmission device 800 to repeat the time-diversity transmission is set in advance with a diversity reception timing controller 811, so that the diversity reception timing controller 811 outputs a timing control signal for starting a time-diversity reception according to the set time. A time-diversity receiver/demodulator 812 receives and demodulates a signal transmitted repeatedly in response to the control signal of a time-diversity reception timing, and outputs a series of demodulated data of every diversity branch (every repeat time). In this example, description is being made on an assumption that a result of demodulation for each symbol in the series of demodulated data is a quantized data in a resolution of four bits, and a mark and a space have their respective values equivalent to $-7$ and $+7$ under the condition of no influence of noises.

A puncturing pattern generator 813 stores a puncturing pattern, which is identical to the puncturing pattern 803b used in the puncturing unit 802 of the transmission device. A depuncturing unit 814 uses this puncturing pattern to depuncture the series of demodulated data of every diversity branch, and outputs a series of depunctured data of every diversity branch. The depuncturing is a process in which the punctured position is filled with a dummy data such as a value of 0 corresponding to a middle value between the soft decision value of $-7$ corresponding to a mark and the soft decision value of $+7$ corresponding to a space, for example. In the case of the foregoing series of punctured data $\{a_1, a_2, b_1, c_1, c_2, d_2, \ldots\}$, the depuncturing unit 814 outputs a series of depunctured data $\{a_1, a_2, b_1, \mathbf{0}, c_1, c_2, \mathbf{0}, d_2, \ldots\}$.

The series of depunctured data of every diversity branch obtained here is combineed symbol by symbol in a unit of block by a combining unit 815, and they are convolution-decoded with a method such as the Viterbi soft quantization by a convolutional decoding unit 816, which in turn outputs a series of decoded information data. There may be a case where the depuncturing and the combining are reversed in their order of transaction.

The devices can thus achieve an improvement in quality of communication for both of the error-correction coding and diversity with the structure as described above, by performing punctured-convolution-coding and time-diversity transmission on the information data to be transmitted, and also combining and depunctured-convolution-decoding after time-diversity reception of the data at the receiving side.

However, the structure of FIGS. 8A and 8B punctures certain identical locations in the series of convolution-coded data (error-correction code word) in each of the repeated transmissions by way of the time-diversity transmission. Therefore, these certain punctured locations and vicinity of them become susceptible to noises, as they become low in likelihood when convolution-decoding them, since they are treated as values having a large length between codes from both of the mark and the space at the receiving side.

SUMMARY OF THE INVENTION

A transmission and reception system of the present invention comprise a transmission device, a receiving device, and a communication pathway between them. The transmission device includes the following elements:

(1) a convolutional coding unit for convolution-coding a series of input data, and outputting a series of convolution-coded data;

(2) a puncturing unit for puncturing the series of convolution-coded data by using a plural form of puncturing patterns individually, and outputting a plurality of series of punctured data; and (3) a modulator/transmitter for modulating and transmitting the plurality of series of punctured data via at least one communication pathway.

And the receiving device includes the following elements:

(1) a receiver/demodulator for receiving and demodulating a signal transmitted by the transmission device through the communication pathway, and outputting a plural variety of series of demodulated data;

(2) a depuncturing unit for depuncturing the plural variety of series of demodulated data by using each of the plural form of puncturing patterns that is identical to the one used by the puncturing unit, and outputting a plural variety of series of depunctured data;

(3) a combining unit for combining the plural variety of series of depunctured data, and outputting a result of combining; and (4) a convolutional decoding unit for convolution-decoding the result of combining, and outputting a decoded data. The transmission and reception system transmits and receives via at least one communication pathway each of the plural variety of series of error-correction coded data obtained by puncturing and convolution-coding the identical series of information data with the plural form of puncturing patterns.

Also, A transmission and reception system of the present invention comprises a transmission device and a receiving device, and that the transmission device includes the following elements:

(1) a convolutional coding unit for outputting a series of input data by convolution-coding them;

(2) a first multiple puncturing pattern generator for generating a predetermined plural form of puncturing patterns having an identical puncturing rate, but different in block pattern of puncturing with one another;

(3) a puncturing unit for puncturing the series of convolution-coded data by using each of the predetermined plural form of puncturing patterns supplied by the first multiple puncturing pattern generator, and outputting a predetermined plurality of different series of punctured data;

(4) a diversity transmission timing controller for outputting a diversity transmission timing control signal for carrying out transmission for a plural number of times at intervals of a predetermined time;

(5) a time-diversity modulator/transmitter for modulating and transmitting the predetermined plurality of different series of punctured data one by one as diversity transmission data at intervals of the predetermined time in response to the diversity transmission timing control signal. The receiving device includes the following elements:

(1) a diversity reception timing controller for outputting a predetermined diversity reception timing control signal for carrying out a reception of the signal transmitted with time-diversity transmission at intervals of the predetermined time;

(2) a time-diversity receiver/demodulator for receiving and demodulating each of the signals transmitted for a plural number of times by the transmission device in response to the diversity reception timing control signal, and outputting individual series of demodulated data;

(3) a second multiple puncturing pattern generator for generating puncturing patterns, which are identical to those generated by the first multiple puncturing pattern generator;

(4) a depuncturing unit for depuncturing each of the series of demodulated data in quantity corresponding to the predetermined number of diversity receptions output from the time-diversity receiver/demodulator by using the predetermined different form of puncturing patterns supplied from by the second multiple puncturing pattern generator, and outputting a plural number of series of depunctured data;

(5) a combining unit for combining the predetermined plural number of series of depunctured data output by the depuncturing unit, symbol by symbol in a unit of block, and outputting a result of combining; and (6) a convolutional decoding unit for convolution-decoding the result of combining, and outputting a decoded data.

The transmission and reception system, the transmission and/or reception device, and the method of transmission and/or reception executes the diversity transmission and reception of a plurality of different series of error-correction code word, as individual diversity branch data, by obtaining them through puncturing and convolution-coding the identical series of information data with different forms of puncturing patterns. Accordingly, the present invention is able to prevent a likelihood of certain information data from declining, and to further improve a quality of communication.

DESCRIPTION OF THE PREFERRED EMBODIMENTS

The present invention relates to a transmission and reception system, a transmission and reception device and a method of transmission and reception, which realize an improvement in quality of communication by taking steps of:

(a) convolution-coding a data to be transmitted;

(b) producing a plurality of different series of punctured data by puncturing it in a unit of a predetermined block with a plural form of puncturing patterns; and (c) transmitting each of the series of punctured data through a plurality of paths (diversity branches), and at a receiving side, by taking steps of:

(a) receiving and demodulating the signals through the plurality of paths (diversity branches);
(b) depuncturing the signals with puncturing patterns corresponding to them;
(c) combining them from symbol to symbol in a unit of block; and
(d) reconstituting the original data by convolution-decoding them.

Exemplary embodiments of the present invention will be described hereinafter by referring to FIG. 1A through FIG. 7.

First Exemplary Embodiment

A first exemplary embodiment of the present invention relates to a time-diversity transmission and reception system for transmitting and receiving the above-cited plurality of different series of punctured data via a plurality of paths with carrier waves of the same frequency (same assigned range of frequency) but different in time (allotted time for transmission).

Figure 1A:
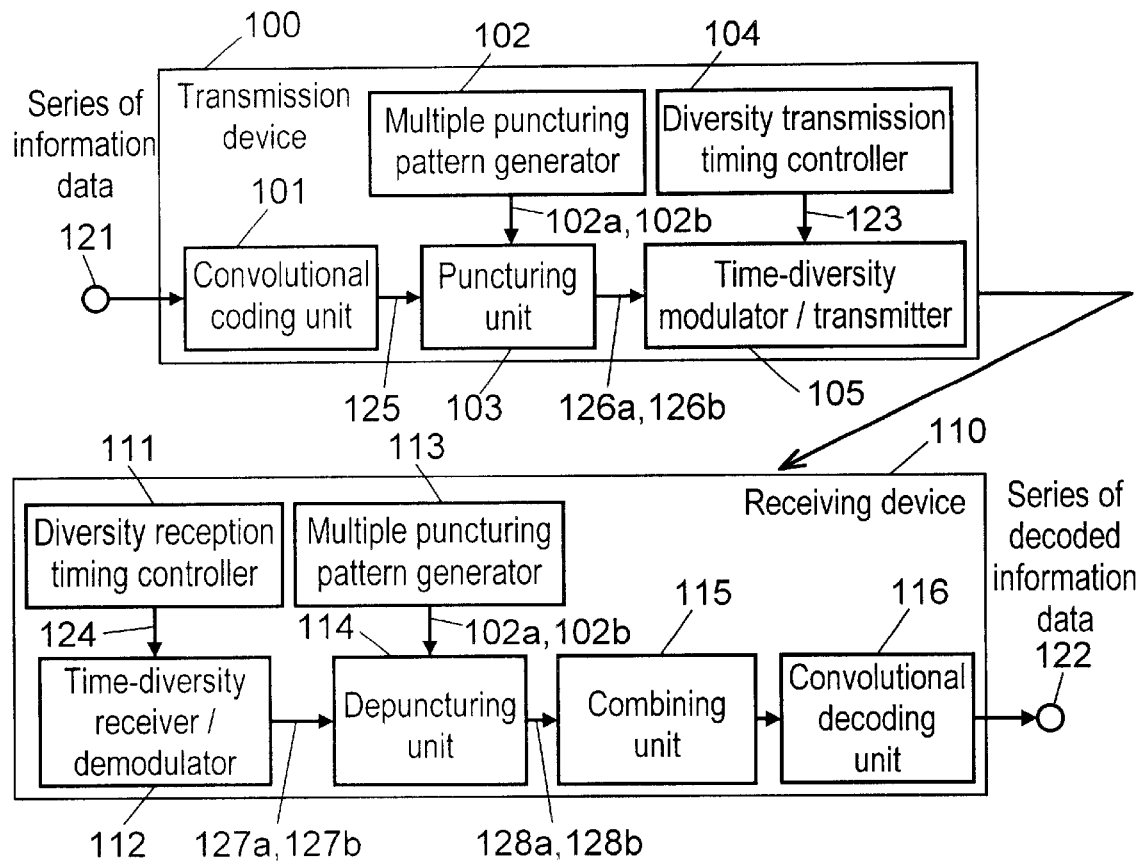
FIGS. 1A and 1B are drawings depicting block diagrams of a time-diversity transmission and reception system of a first exemplary embodiment of the present invention.
Figure 1B:
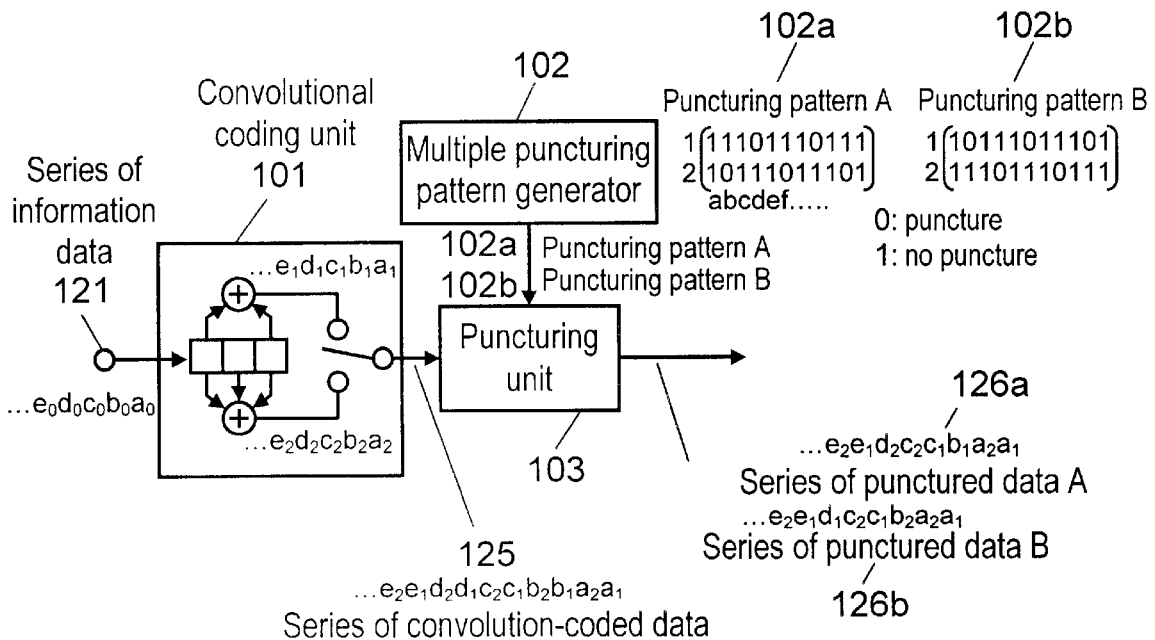
Figure 8A:
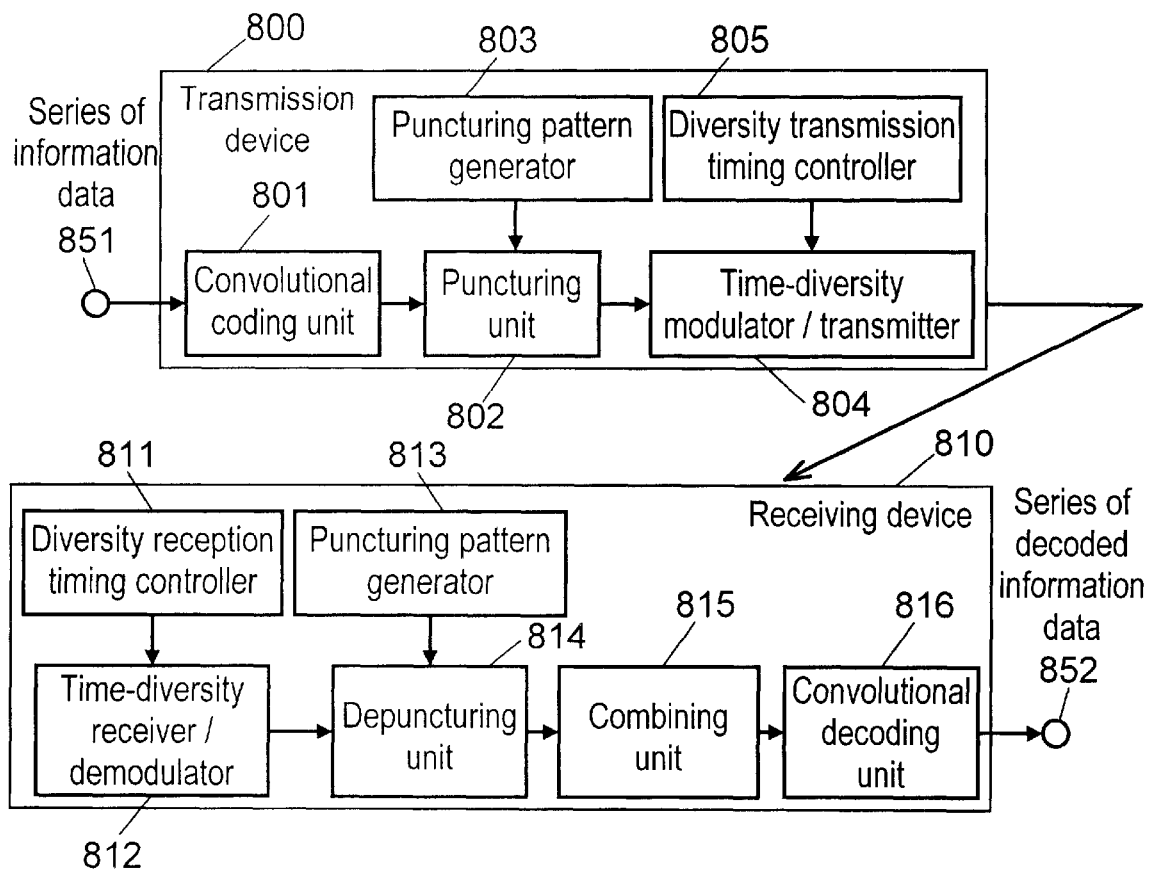
FIGS. 8A and 8B are drawings depicting block diagrams of an example of a time-diversity transmission and reception system of the prior art.
Figure 8B:
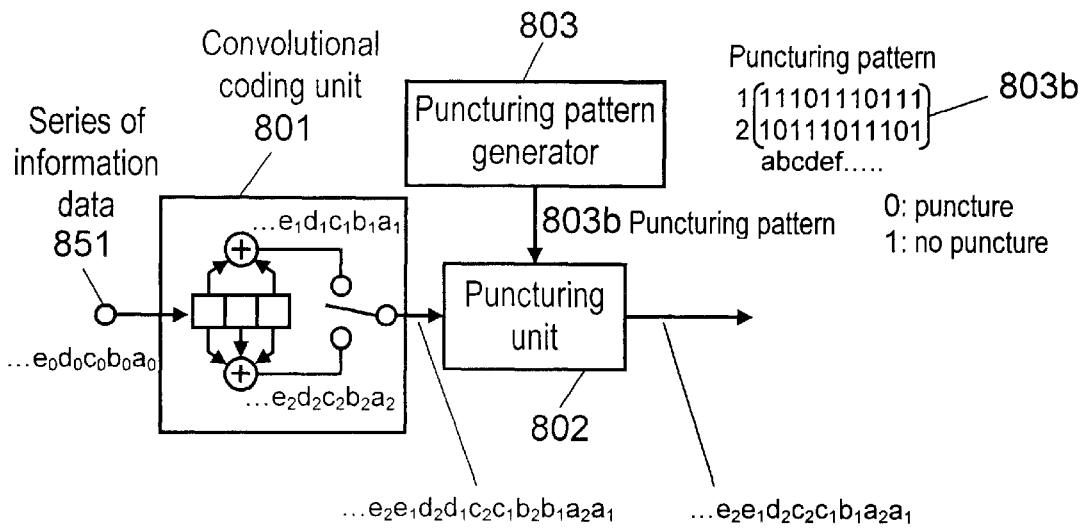

FIG. 1A depicts a structure of a time-diversity transmission and reception system of the first exemplary embodiment, and FIG. 1B is a drawing for use in describing an essential part of the same. A primary difference of the present structure from that shown in FIGS. 8A and 8B as described in the prior art system is that the puncturing pattern generator provided in each of the transmission device and the receiving device for generating a single form of the puncturing pattern is replaced by a multiple puncturing pattern generator for generating a plurality of puncturing patterns in various forms. Although the present embodiment is an example in which transmission and reception are made via two paths in order to simplify the description, a number of paths can be expanded easily without impairing the universality.

First, a convolutional coding unit 101 convolution-codes a series of input information data 121, and outputs it as a series of convolution-coded data 125. The convolutional coding unit 101 in FIG. 1B is an example of circuit structure for convolution coding in a constraint length of 3 and a coding rate of 1/2.

On the other hand, a multiple puncturing pattern generator 102 generates two forms of puncturing patterns having an identical puncturing rate, but different in block pattern of puncturing with each other. For instance, it generates two different puncturing patterns, a pattern A, 102a, and a pattern B, 102b, both having a same puncturing rate of 17/22 (a number of bits after puncturing/a number of bits before the puncturing), as shown in FIG. 1B. In the figure, a numeral "0" indicates a location where the puncturing (thinning-out) is made within the puncturing patterns, and the puncturing locations are set in a manner that they do not overlap with each other between the patterns A and B.

A puncturing unit 103 punctures the series of convolution-coded data 125 by using the two puncturing patterns, the pattern A, 102a, and the pattern B, 102b, and outputs respective series of punctured data 126a and 126b.

Although the foregoing structure comprises the multiple puncturing pattern generator 102 and the puncturing unit 103 as being two separate blocks, the two functions can be combined into one block. In other words, the puncturing unit may have the function of generating plural forms of puncturing patterns as well as the function of puncturing.

A diversity transmission timing controller 104 outputs two series of diversity transmission timing control signal 123 for the transmission device 100 to make time-diversity transmission at intervals of a predetermined time.

A time-diversity modulator/transmitter 105 carries out the time-diversity transmission twice in response to each of the two orders of diversity transmission timing control signal 123 delivered by the diversity transmission timing controller 104 by using the series of punctured data 126a for a first data of the time-diversity modulation and transmission and the series of punctured data 126b for a second data of the time-diversity modulation and transmission.

On the other hand, the predetermined time for the transmission device 100 to carry out the time-diversity transmission is set in advance with a diversity reception timing controller 111 of a receiving device 110, so that the controller 111 outputs a diversity reception timing control signal 124 twice on time for a start of time-diversity reception.

A time-diversity receiver/demodulator 112 receives and demodulates the time-diversity transmitted signal in response to the diversity reception timing control signal 124, and outputs two series of demodulated data 127a and 127b of every diversity branch.

A multiple puncturing pattern generator 113 generates two forms of puncturing patterns that are identical to those produced by the multiple puncturing pattern generator 102 of the transmission device 100.

A depuncturing unit 114 depunctures the series of demodulated data 127a and 127b by using the puncturing patterns 102a and 102b supplied by the multiple puncturing pattern generator 113, one after another, and outputs series of depunctured data 128a and 128b. In this depuncturing process, digital values in the series of demodulated data are output with their original values for unpunctured locations in the puncturing patterns, and a middle value between values of a mark and a space is inserted in each of the punctured locations. For instance, if individual symbols in the series of demodulated data are output in quantized soft decision values in a resolution of four bits, the mark and the space have values of −7 and +7 respectively, and a middle value between them corresponds to "0".

In the foregoing structure, although the multiple puncturing pattern generator 113 and the depuncturing unit 114 have been described as separate blocks, both of the functions can be combined into one block. For example, the depuncturing unit may have the function of generating two forms of puncturing patterns that are identical to those generated by the multiple puncturing pattern generator 102 of the transmission device 100, as well as the function of depuncturing.

A combining unit 115 combines the series of depunctured data 128a and 128b of every diversity branch, symbol by symbol in a unit of block. In the case of foregoing example, two 4 bits of digital data are added together. In the present exemplary embodiment, the addition of digital values in locations of the specific symbols does not leave the value "0" intact, since the locations where the value "0" is inserted in the depuncturing process differ between the two series of depunctured data 128a and 128b, as a matter of course. In the prior art techniques, on the other hand, a result of addition of digital values in certain symbols has left the value "0" unchanged after depuncturing, thereby causing the likelihood extremely low, since puncturing locations in blocks during the puncturing process have not varied, but remained same throughout time-diversity.

A convolutional decoding unit 116 decodes the series of combineed results output by the combining unit 115 with a method such as the Viterbi soft quantization and the like means, and outputs a decoded series of information data 122.

As has been described, the present exemplary embodiment of this invention obtains two different series of punctured data by puncturing identical series of information data with two different forms of puncturing patterns, and executes time-diversity transmission of the obtained series of data as transmission data of individual diversity branches. A receiver combines the transmitted data after depuncturing them by using two different forms of puncturing patterns, which are identical to those of the transmission side, and carries out convolution-decoding. In this way, the invention prevents a reduction of likelihood from concentrating on certain information data, since the punctured locations differ between individual diversity branches, so as to improve quality of the communication.

Although the described embodiment is an example that uses two forms of puncturing patterns, this is not restrictive. A concept of the present exemplary embodiment is adaptable even to a structure, in which a number of puncturing patterns generated by the multiple puncturing pattern generator of the transmission device and the receiving device is increased to three forms or more, and a number of branches for the time-diversity transmission and reception is increased to three or more, so long as these branches include different puncturing patterns.

Also, while the present exemplary embodiment as described above includes FIG. 1B showing an example of circuit structure for the convolution coding in a constraint length of 3 and a coding rate of 1/2, and describes the puncturing as being made in a puncturing rate of 17/22, they are not restrictive as it is needless to mention.

Further, although the puncturing locations are said to be not overlapping among the plurality of puncturing patterns in the described embodiment, this is not restrictive, as some of the puncturing locations may overlap.

Moreover, it goes without mentioning that the system can be constructed in a manner that the convolutional coding unit is supplied with a series of data processed by other error-correction coding or error-detection coding as the series of information data. Or, the system may comprise a processing unit for interleaving and/or another unit for composing a burst, inserted between the puncturing unit and the modulator/transmitter.

Second Exemplary Embodiment

A second exemplary embodiment relates to an improvement of the multiple puncturing pattern generator in the time-diversity transmission and reception system of the first exemplary embodiment. The present system produces a reference matrix for generating a puncturing pattern at first, and generates plural forms of puncturing patterns by converting the reference matrix.

Figure 2A:
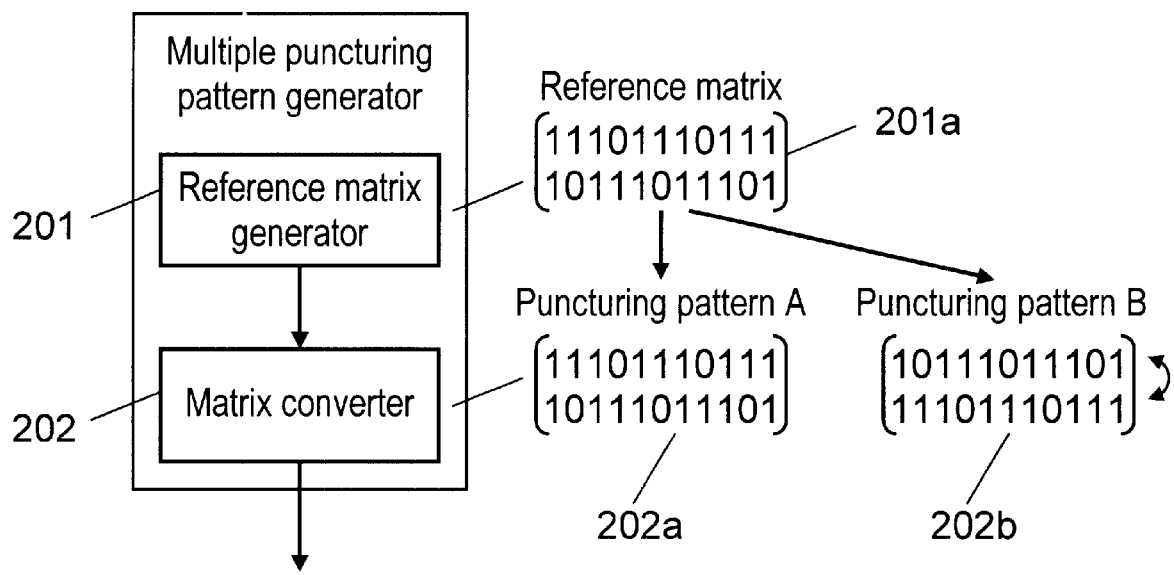
FIGS. 2A, and 2B are drawings depicting a block diagram of a multiple puncturing pattern generator of a second exemplary embodiment of the present invention, and an example of generated puncturing patterns.

FIG. 2A shows an internal structure of a multiple puncturing pattern generator (corresponding to the generators 102 and 113 in FIGS. 1A and 1B) of the second exemplary embodiment. In FIG. 2A, a reference matrix generator 201 is for generating a matrix for use as a reference when generating a plurality of puncturing patterns, and a matrix 201a is an example of the reference matrix generated by it.

A matrix converter 202 outputs a plurality of puncturing patterns by converting a row, a column or matrix elements of the reference matrix 201a according to a predetermined process. In the example of FIG. 2A, the matrix converter 202 outputs two forms of puncturing patterns 202a and 202b by exchanging rows in the reference matrix 201a. That is, the multiple puncturing pattern generator 102 first generates a matrix data from the reference matrix 201a without exchanging any of the rows, and outputs it as the puncturing pattern 202a. It then exchanges between a first row and a second row of the reference matrix 201a, and outputs it as the puncturing pattern 202b. The structure and function of the time-diversity transmission and reception system of the second exemplary embodiment, other than the foregoing, remain the same as those of FIGS. 1A and 1B.

With the present exemplary embodiment as described above, the system is able to save a memory capacity as compared to the system of the first exemplary embodiment, since it stores only one matrix as a reference for the multiple puncturing pattern generator to generate a plurality of puncturing patterns.

Figure 2B:
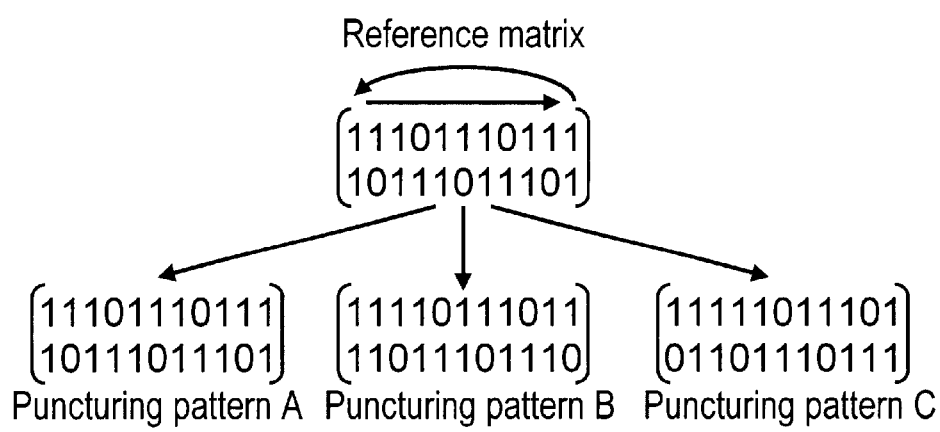

Although in the foregoing description of FIG. 2A in the present exemplary embodiment, the matrix converter adopts a method for exchanging matrix elements in rows of the reference matrix, this is not restrictive, and it may use a method of generating a plurality of puncturing patterns by exchanging column by column, as shown in FIG. 2B. There are also other methods of generating a plurality of puncturing patterns such as one that combines a plurality of rows in a predetermined order.

Third Exemplary Embodiment

A third exemplary embodiment relates to an improvement of the combining unit in the receiving device of the time-diversity transmission and reception system of the first exemplary embodiment. The present system obtains a result of combining by weighting a series of depunctured data according to a level of receiving signal, and adding it symbol by symbol.

Figure 3:
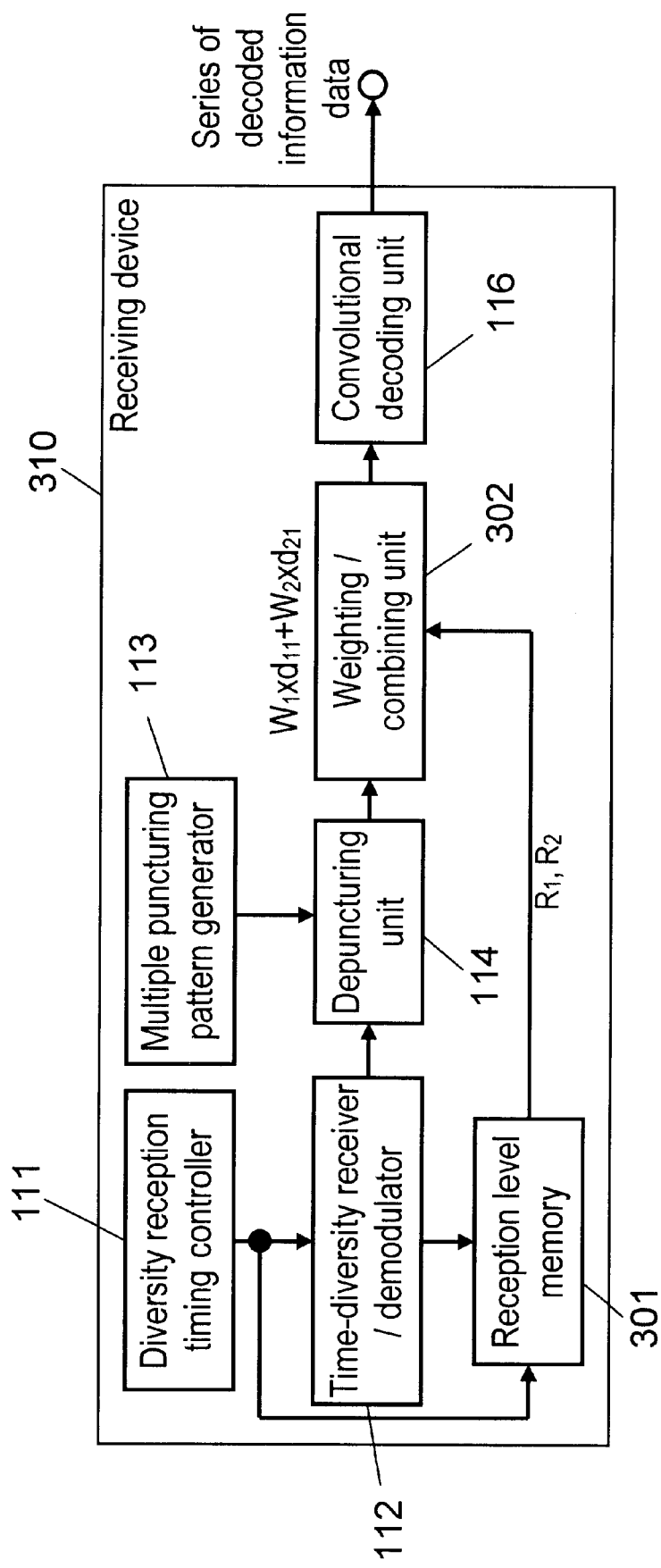
FIG. 3 is a drawing depicting a block diagram of a receiving device of a time-diversity transmission and reception system of a third exemplary embodiment of the present invention.

FIG. 3 shows a structure of a receiving device 310 in a time-diversity transmission and reception system of the third exemplary embodiment. A reception level memory 301 measures a level of receiving signal at a time-diversity receiver/demodulator 112 in response to a diversity reception timing control signal supplied by a diversity reception timing controller 111, and stores a result of the measurement for every diversity branch. In this example, the reception level memory 301 stores reception levels R1 and R2 for each of the time-diversity signals transmitted twice.

A weighting/combining unit 302 weights a series of depunctured data of every diversity branches delivered from a depuncturing unit 114 according to the reception level stored in the reception level memory 301, and combines it thereafter, symbol by symbol in a unit of data block. If weighting factors for each of the two diversity branches obtained according to magnitudes of the reception levels R1 and R2 are denoted by W1 and W2, and digital values at number "i" in order of succession in the block of each series of punctured data by d1i and d2i, then a weighted-and-combineed result "di" can be expressed by the following formula:

$$di=(W1{\times}d1i+W2{\times}d2i)/(W1+W2)$$

The structure and function of the time-diversity transmission and reception system of this exemplary embodiment, other than the foregoing, remain the same as those of FIGS. 1A and 1B.

In this embodiment, it is assumed that a magnitude of weighting is classified into three steps of "large", "medium" and "small" according to the reception level with their respective weighting factors of "1", "½" and "¼", and the reception levels R1 and R2 are of magnitudes corresponding to "large" and "medium" respectively. In this instance, a weighting factor W1 for the first diversity branch becomes "1", and a weighting factor W2 for the second diversity branch becomes "½" at the weighting/combining unit 302. If the series of depunctured data for two diversity branches supplied from the depuncturing unit 114 are assumed to be d1={5, 7, −6, 0, −7 . . . } and d2={3, −2, 0, 4, −7 . . . } respectively, a series of data "d" obtained as a result of combining is d={4.3, 4, −4, 1.3, −7 . . . }, so that these data are supplied to a convolutional decoding unit 116.

Accordingly, the present exemplary embodiment of the invention is expected to achieve an effectiveness equivalent to the maximum-ratio combining diversity, since it combines depunctured data after weighting the data according to reception levels for each diversity branch of the received time-diversity signal, when combining the depunctured data.

Although the foregoing example of the present exemplary embodiment has chosen a three-step classification for reception level with respective weighting factors of "1", "½" and "¼", this is not exclusive. The classification can be set for any number of steps, and the weighting factors can be of any values so long as they correspond with the reception levels.

Also, while the foregoing exemplary embodiment has made the proportional combining calculations to include a decimal fraction in the weighting/combining unit 302, this is not restrictive, and integral calculation may be made without regarding decimal fraction.

Fourth Exemplary Embodiment

A fourth exemplary embodiment relates to a code division multiplex signal transmission and reception system for transmitting and receiving the above-cited plurality of different series of punctured data with a plurality of paths for code division multiplex signal.

Figure 4:
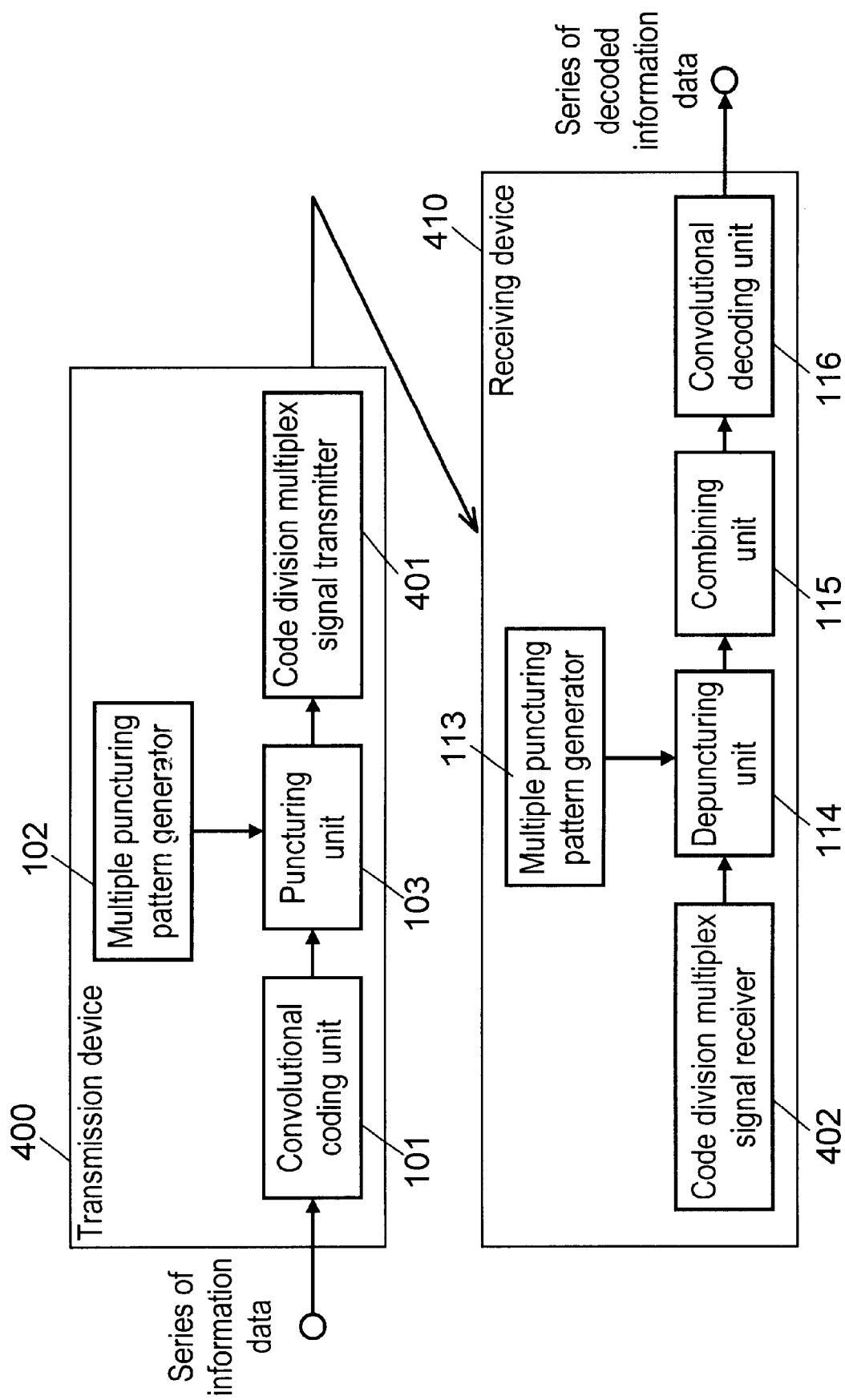
FIG. 4 is a drawing depicting a block diagram of a transmission and reception system of a fourth exemplary embodiment of the present invention.

FIG. 4 shows a structure of a transmission and reception system of the fourth exemplary embodiment. The system of FIG. 4 is provided with a code division multiplex signal transmitter 401 for code-division-multiplexing and transmitting a predetermined plural number of series of punctured data fed in it, in place of the diversity transmission timing controller 104 and the time-diversity modulator/transmitter 105 in the transmission device 100 of FIG. 1A. The system is also provided with a code division multiplex signal receiver 402 for receiving and demodulating individual signals transmitted with code-division-multiplexing and outputting a series of demodulated data, in place of the diversity reception timing controller 111 and the time-diversity receiver/demodulator 112 in the receiving device 110 of FIG. 1A.

The transmission and reception system constituted as above will be described hereinafter for the portions that operate differently from that of the first exemplary embodiment. The transmission device 400 transmits a plural variety of punctured data series output from a puncturing unit 103 after they are code-division-multiplexed and spread-modulated by the code division multiplex signal transmitter 401. The receiving device 410 receives the transmitted signals multiplexed by code-division multiplexing, demodulates each of the multiplexed signals with a despreading process by the code division multiplex signal receiver 402, and supplies a predetermined plural number of series of demodulated data to a depuncturing unit 114. All other operations in the FIG. 4 are same as those of FIGS. 1A and 1B.

As described, this exemplary embodiment of the present invention enables the system to improve quality of communication in the like manner as the one using time-diversity transmission and reception, since it carries out transmission and reception of a plurality of different series of punctured and convolution-coded data with the code division multiplexing instead of the time-diversity transmission and reception.

Fifth Exemplary Embodiment

A fifth exemplary embodiment relates to a path-diversity transmission and reception system, in which a plurality of transmission devices transmits the above-described plurality of different series of punctured data via a plurality of paths, and a receiving device receives the same.

Figure 5:
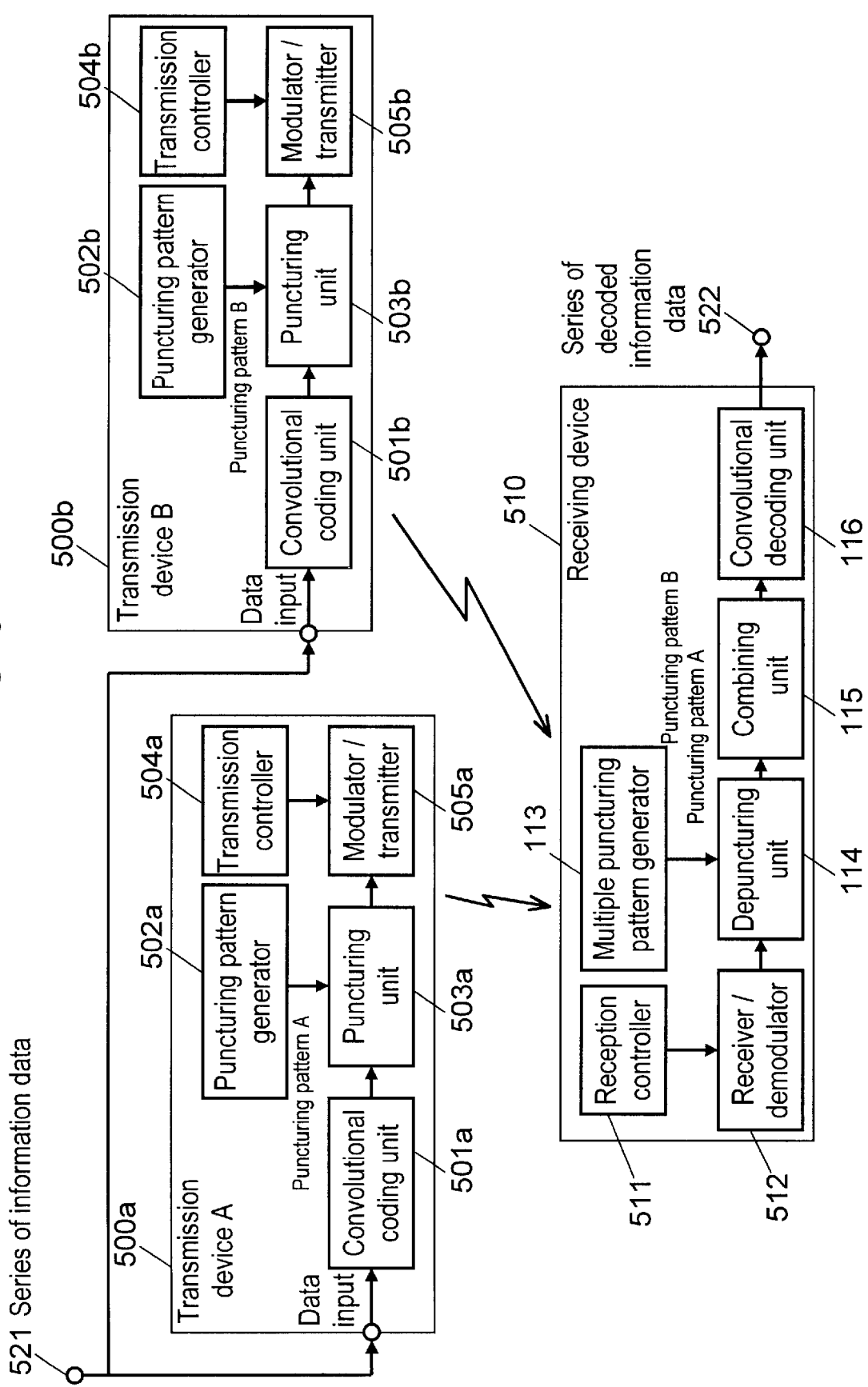
FIG. 5 is a drawing depicting a block diagram of a transmission and reception system of a fifth exemplary embodiment of the present invention.

FIG. 5 shows a structure of a transmission and reception system of the fifth exemplary embodiment. A path-diversity transmission system comprises two units of transmission devices 500a and 500b for processing and modulating identical series of information data, and transmitting them in a manner to avoid overlapping in time.

A puncturing pattern generator in each of the transmission devices is adapted to generate a puncturing pattern having the same puncturing rate but in a different form from each other. A puncturing pattern generator 502a generates a puncturing pattern that is identical to the puncturing pattern 102a in FIG. 1B, and a puncturing pattern generator 502b generates a puncturing pattern identical to the pattern 102b in the same figure.

Convolutional coding units 501a and 501b in the two transmission devices convolution-code a series of information data 521 fed in them, and output series of convolution-coded data. In the transmission device 500a, a puncturing unit 503a punctures the obtained series of convolution-coded data by using the puncturing pattern A, 102a, of FIG. 1B supplied from the puncturing pattern generator 502a. And, a puncturing unit 503b in the transmission device 500b punctures the obtained series of convolution-coded data by using the puncturing pattern B, 102b, of FIG. 1B supplied from the puncturing pattern generator 502b. Modulator/transmitters 505a and 505b modulate and transmit the series of punctured data obtained in the foregoing puncturing units according to information for transmission timings and transmission frequencies supplied from transmission controllers 504a and 504b in the individual transmission devices. Each of the signals transmitted by the transmission devices 500a and 500b has approximately same frequency, and is so arranged not to overlap in transmission timing with each other.

A receiving device 510 receives and demodulates the signals transmitted by the two transmission devices 500a and 500b according to information for a predetermined reception timing and a receiving frequency supplied from a reception controller 511, and outputs respective series of demodulated data.

A depuncturing unit 114 depunctures the series of demodulated data of the signal transmitted by the transmission device 500a with a puncturing pattern, which is identical to the pattern 102a generated by the puncturing pattern generator 502a, out of the two predetermined forms of different puncturing patterns supplied by a multiple puncturing pattern generator 113, and the series of demodulated data of the signal transmitted by the transmission device 500b with a puncturing pattern that is identical to the pattern 102b generated by the puncturing pattern generator 502b, and outputs respective series of depunctured data.

Following the above, a combining unit 115 combines a plural series of the depunctured data delivered from the depuncturing unit 114, symbol by symbol in a unit of block. A convolutional decoding unit 116 then convolution-decodes the obtained series of combineed results, and outputs a series of decoded information data 522.

With the present exemplary embodiment of this invention, as described above, when transmitting identical series of information data with a plurality of transmission devices, the transmission devices transmit the identical series of information data after puncturing and convolution-coding each of the data series with a different puncturing pattern among the transmission devices. A receiving device depunctures the signals transmitted by each of the transmission devices with the identical patterns that are used by the transmission devices. In this way, the invention is able to vary puncturing locations from one transmission device to another, so as to avoid a reduction in likelihood of certain information data, and to further improve quality of the communication.

Although the transmission controllers 504a and 504b in the present exemplary embodiment are so arranged that transmission frequency from each of the transmission devices are approximately equal, and their transmission timings do not overlap with each other, these are not restrictive. Instead, the transmission frequency from the transmission devices may be arranged so as not to overlap with each other, while maintaining the transmission timings approximately equal between the transmission devices. Or, both of the transmission timings and the transmission frequency can be arranged not to overlap between the transmission devices. In these cases, information for reception timings and receiving frequencies need to be set with the reception controller 511 according to the information of the transmission side.

Also, the transmission devices may be provided with code-division multiplex signal transmitters, instead of the modulator/transmitters 505a and 505b in each of the transmission devices, for modulating and transmitting the series of punctured data with code-division multiplexing according to information for transmission timing and transmission frequency, while maintaining the transmission timings and the transmission frequencies set by the transmission controllers 504a and 504b in the transmission devices approximately equal. At the same time, the receiving device comprises a code-division multiplex signal receiver, instead of the receiver/demodulator 512, for outputting a series of demodulated data by receiving and demodulating every signals transmitted with code-division multiplexing from each of the transmission devices by way of extracting them with the despreading process, while maintaining the reception timings and the reception frequencies set with the reception controller 511 for the signals transmitted by the transmission devices approximately equal. Hence a system can be constituted with a plurality of transmission devices for transmitting identical series of information data by code-division multiplexing, and a receiving device for receiving and demodulating every code-division multiplexed signals.

In addition, although the system of the present exemplary embodiment is provided with two transmission devices, this is not exclusive and three or more transmission devices can be provided, as long as puncturing patterns used by the individual transmission devices are generated in different varieties, and a multiple puncturing pattern generator in the receiving device is adapted to generate every one of these patterns. Moreover, although both of the transmission devices independently perform the entire operation between input and transmission of the series of information data, an operation common to both devices may be made together by providing an input processing unit for processing input data.

Sixth Exemplary Embodiment

A sixth exemplary embodiment relates to a time and space diversity transmission and reception system, which transmits the above-described plurality of different series of punctured data via a plurality of paths with a same carrier wave but different in time, and receives with a plurality of receiving devices.

Figure 6:
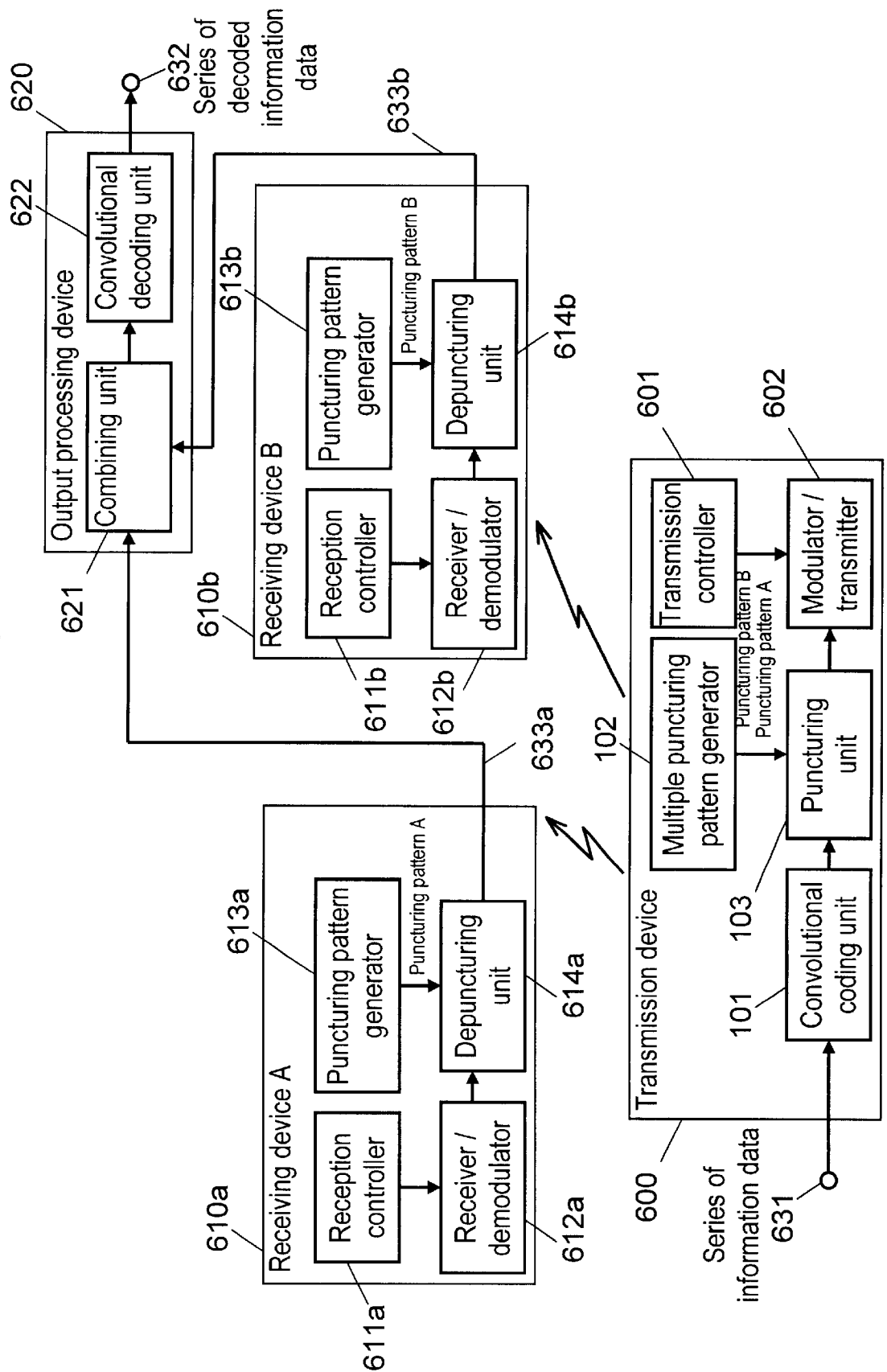
FIG. 6 is a drawing depicting a block diagram of a transmission and reception system of a sixth exemplary embodiment of the present invention.

FIG. 6 shows a structure of a transmission and reception system of the sixth exemplary embodiment. A space diversity reception system comprises a transmission device 600 for transmitting a signal, and two units of receiving devices 610a and 610b for performing a process of receiving and demodulating the signal. In FIG. 6, the transmission device 600 is provided with a transmission controller 601 and a modulator/transmitter 602 in place of the diversity transmission timing controller 104 and the time-diversity modulator/transmitter 105 in the transmission device 100 of FIGS. 1A and 1B. In the transmission device 600, an operation is carried out in the same manner as the transmission device 100 of the first exemplary embodiment between a process of convolution-coding the series of information data being transmitted and a process of puncturing them into two different series of punctured data by using two different puncturing patterns A, 102a, and B, 102b shown in FIG. 1B.

The modulator/transmitter 602 modulates and transmits one of the two different series of punctured data obtained with the puncturing pattern A, 102a, of FIG. 1B toward the receiving device 610a according to information of a predetermined transmission timing and transmission frequency for the receiving device 610a supplied from the transmission controller 601. The modulator/transmitter 602 also modulates and transmits another series of data punctured with the puncturing pattern B, 102b, of FIG. 1B toward the receiving device 610b according to the information of a predetermined transmission timing and transmission frequency for the reception device 610b supplied from the transmission controller 601. An arrangement is made in advance so that the transmission timings set for the two series of punctured data do not overlap with each other, and the transmission frequencies are approximately same.

The two units of receiving devices 610a and 610b receive and demodulate the signals transmitted to them from the transmission device 600 according to the information for transmission timings and transmission frequencies supplied by their respective reception controllers 611a and 611b, and output respective series of demodulated data.

In the receiving devices 610a, a depuncturing unit 614a depunctures the series of demodulated data by using the puncturing pattern A, 102a, supplied from a puncturing pattern generator 613a, and outputs a series of depunctured data 633a.

In the receiving devices 610b, on the other hand, a depuncturing unit 614b depunctures the series of demodulated data by using the puncturing pattern B, 102b, supplied from a puncturing pattern generator 613b, and outputs a series of depunctured data 633b.

An output processing device 620 accumulates the series of depunctured data 633a and 633b supplied from both of the receiving devices, and a combining unit 621 combines them symbol by symbol in a unit of block. Then, a convolutional decoding unit 622 convolution-decodes the combineed result, and outputs a series of decoded information data 632.

As has been described, the foregoing exemplary embodiment of the present invention punctures and convolution-codes a series of information data with different puncturing patterns for every transmission to the individual receiving devices when transmitting identical series of information data to the plurality of the receiving devices, thereby enabling the system to vary puncturing locations for every transmission to the individual receiving devices, prevent a degradation in likelihood of certain information data, and further improve quality of communication.

Although the transmission controller 601 in the present exemplary embodiment is so arranged in advance that transmission frequencies to the individual receiving devices are approximately equal, and their transmission timings do not overlap with each other, these are not restrictive. Instead, the transmission frequencies to the individual receiving devices may be arranged so as not to overlap between the transmissions, while maintaining the transmission timings approximately equal. Or, both of the transmission timings and the transmission frequencies can be arranged not to overlap between the transmissions to the receiving devices. In these cases, information for reception timings and receiving frequencies are to be set with the reception controllers 611a and 611b in the individual receiving devices according to information of the transmission side.

Also, the transmission devices may be provided with a code-division multiplex signal transmitter, instead of the modulator/transmitter 602, for modulating and transmitting the plurality of punctured data series with code-division multiplexing, while maintaining the transmission timings and the transmission frequencies of the transmission controller 601 approximately equal. At the same time, each of the receiving devices may comprise a code-division multiplex signal receiver, instead of the receiver/demodulators 612a and 612b, for outputting series of demodulated data by receiving and demodulating a specific signal addressed to the individual receiving devices out of the signals transmitted with code-division multiplexing from the transmission device by way of extracting it with the despreading process, while setting the reception timings and the receiving frequencies approximately equal between the reception controllers 611a and 611b. Hence the system can be constituted with a transmission device for transmitting identical series of information data by code-division multiplexing to a plurality of receiving devices, and the receiving devices for receiving and demodulating the code-division multiplexed signals.

Furthermore, each receiving device may be provided with a reception level measuring unit for measuring individual signal levels received by the receiver/demodulator 612a or 612b according to information for the reception timing and the reception frequency supplied by the reception controller 611a or 611b, and outputting a result of the measurements. Also, the output processing device 620 may be provided with a weighting/combining unit, instead of the combining unit 621, for weighting and combining the individual series of depunctured data based on the signal reception levels supplied by the individual receiving devices in order to gain an effectiveness equivalent to the maximum-ratio combine diversity, in the same manner as the third exemplary embodiment.

Although the system of the described embodiment is provided with two receiving devices, this is not exclusive and three or more receiving devices may be provided, if puncturing patterns to be used for puncturing during transmission to the individual receiving devices are generated in different varieties, and a multiple puncturing pattern generator in the transmission device is adapted to generate every one of these patterns.

Seventh Exemplary Embodiment

A seventh exemplary embodiment relates to a satellite-path diversity transmission and reception system, in which a transmission device transmits the above-described plurality of different series of punctured data via a plurality of paths with same carrier wave but different in time, and a receiving device receives them via a plurality of satellite repeater stations.

Figure 7:
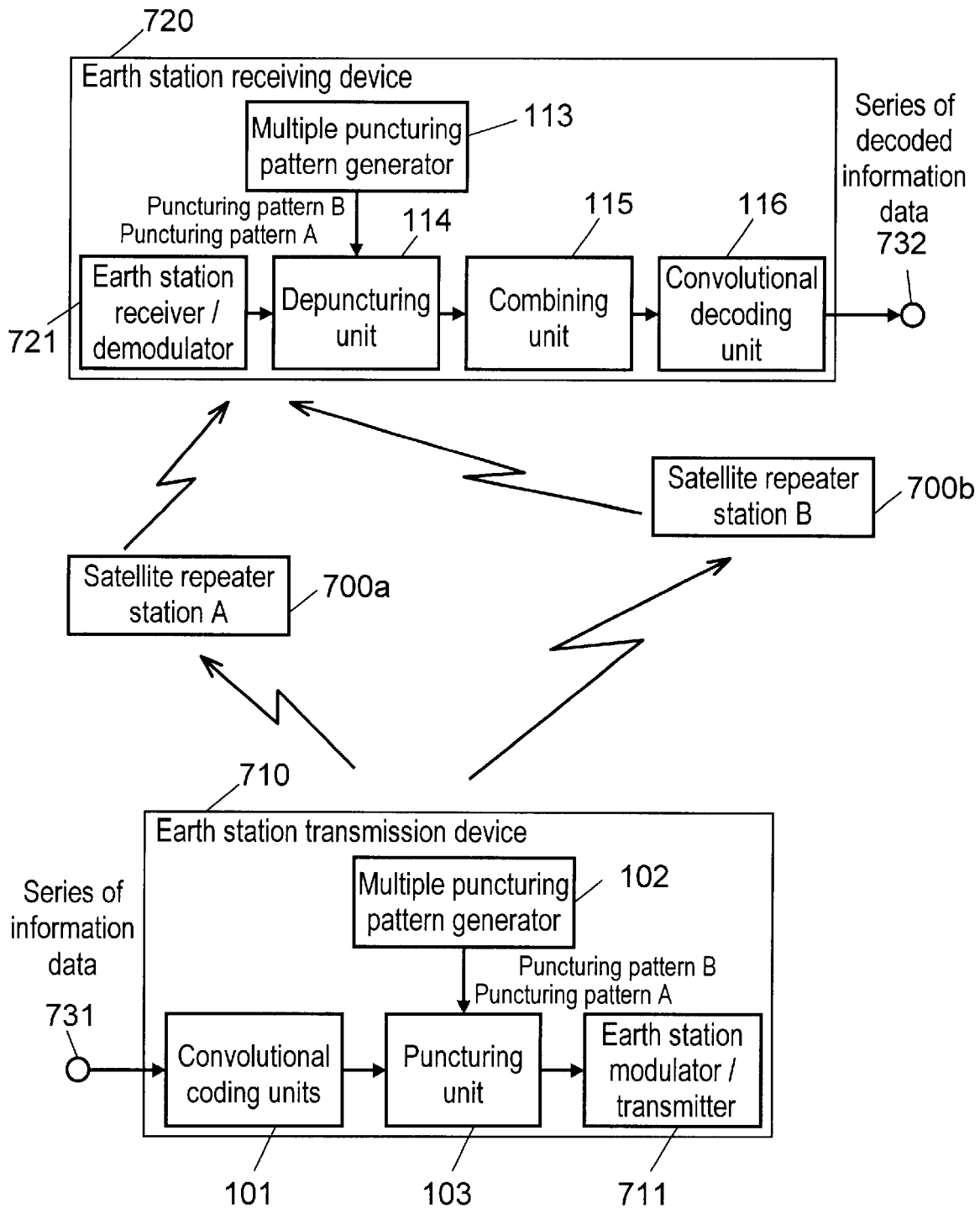
FIG. 7 is a drawing depicting a block diagram of a satellite-path diversity transmission and reception system of a seventh exemplary embodiment of the present invention.

FIG. 7 shows a structure of a satellite-path diversity transmission and reception system of the seventh exemplary embodiment. Satellite repeater stations 700a and 700b relay transmission signals from an earth station transmission device 710 to an earth station receiving device 720. The earth station transmission device 710 is provided with an earth station modulator/transmitter 711 in place of the diversity transmission timing controller 104 and the time-diversity modulator/transmitter 105 in the transmission device 100 of FIGS. 1A and 1B. All other structure and operation remain same as the transmission device 100 of FIGS. 1A and 1B.

Also, the earth station receiving device 720 is provided with an earth station receiver/demodulator 721 in place of the diversity reception timing controller 111 and the time-diversity receiver/demodulator 112 in the receiving device 110 of FIGS. 1A and 1B. All other structure and operation remain same as the receiving device 110 of FIGS. 1A and 1B.

The satellite-path diversity transmission and reception system constructed as above operates in a manner, which will be described hereinafter. In the earth station transmission device 710, a convolutional coding unit 101 convolution-codes identical series of information data at first. A puncturing unit 103 punctures the series of obtained convolution-coded data by using each of two forms of puncturing patterns A, 102a, and B, 102b, shown in FIG. 1B, supplied from a multiple puncturing pattern generator 102, and outputs two series of punctured data.

The earth station modulator/transmitter 711 modulates and transmits a series of data punctured with the puncturing pattern A, 102a, out of the two series of punctured data supplied from the puncturing unit 103 toward the satellite repeater station 700a. The earth station modulator/transmitter 711 also modulates and transmits another series of data punctured with the puncturing pattern B, 102b, toward the satellite repeater station 700b.

The earth station receiver/demodulator 721 in the earth station receiving device 720 receives and demodulates individual transmission signals relayed via the satellite repeater stations 700a and 700b, and outputs two varieties of demodulated data series.

A depuncturing unit 114 depunctures the series of demodulated data derived from a signal of the satellite repeater station 700a, out of the two series of demodulated data supplied from the earth station receiver/demodulator 721, by using a puncturing pattern, which is identical to the puncturing pattern A, 102a, supplied by a multiple puncturing pattern generator 113. The depuncturing unit 114 also depunctures another series of demodulated data derived from a signal of the satellite repeater station 700b by using a puncturing pattern that is identical to the puncturing pattern B, 102b, supplied by the multiple puncturing pattern generator 113.

A combining unit 115 combines the two varieties of depunctured data series obtained here from symbol to symbol in a unit of block. Then, a convolutional decoding unit 116 convolution-decodes the combineed result, and outputs a series of decoded information data 732.

With the present exemplary embodiment of this invention, as has been described, the earth station transmission device punctures identical series of information data by using a plurality of different puncturing patterns, and executes a satellite-path diversity transmission of the different series of obtained punctured data to a plurality of satellites as transmission data for individual satellite-path diversity branches. The earth station receiving device depunctures the transmission data by using a plurality of different puncturing patterns, which are identical to those of the transmission side, combines and convolution-decodes thereafter. In this way, the invention is able to avoid a degradation in likelihood of certain information data, and to further improve quality of the communication.

Although the present exemplary embodiment has a structure for making a unidirectional communication from the earth station transmission device to the earth station receiving device, this is not restrictive. In a system comprising a plurality of earth stations for performing a path-diversity transmission and reception via a plurality of satellite repeater stations, for example, each of the earth stations may comprise both of an earth station transmission device 710 and an earth station receiving device 720.

Although the system of the described embodiment is adapted to use two satellite repeater stations, this is not exclusive and three or more repeater stations can be used as is evident from the other exemplary embodiments.

Again, although the foregoing first, fourth, fifth and sixth exemplary embodiments are systems that make one-way communication from transmission devices to receiving devices, they can be systems that make bi-directional communication between two transmission/reception devices having a combined function of both transmission device and receiving device and sharing common functional components between them.

Although the transmission device in each of the foregoing exemplary embodiments has been described as having a (multiple) puncturing pattern generator and a puncturing unit as separate blocks, they can be combined into one block. For example, the puncturing unit may be adapted to generate a (or plural forms of) puncturing pattern(s), and carry out puncturing also. In the same manner, the receiving device has been described as having a (multiple) puncturing pattern generator and a depuncturing unit as separate blocks, they can be combined also into one block. For example, the depuncturing unit may be adapted to generate a (or plural forms of) puncturing pattern(s) identical to the (plural forms of) puncturing pattern(s) generated by the (multiple) puncturing pattern generator of the transmission device, and carry out depuncturing.

Accordingly, a system of the present invention convolution-codes series of information data by using puncturing patterns, which differ from one diversity branch to another, when transmitting and receiving primarily the series of information data with a combination of punctured-convolution-coding and diversity, thereby preventing a degradation in likelihood of certain information data, and achieving a remarkable improvement in quality of communication.

Reference Numerals 100, 400, 500a, 500b, 600, 800 Transmission device
101, 501a, 501b, 801 Convolutional coding unit
102, 113 Multiple puncturing pattern generator
102a, 102b, 202a, 202b, 803b Puncturing pattern
103, 503a, 503b, 802 Puncturing unit
104, 805 Diversity transmission timing controller
105, 804 Time-diversity modulator/transmitter
110, 310, 410, 510, 610a, 610b, 810 Receiving device
111, 811 Diversity reception timing controller
112, 812, Time-diversity receiver/demodulator
114, 614a, 614b, 814 Depuncturing unit
115, 621, 815 Combining unit
116, 622, 816 Convolutional decoding unit
121, 521, 631, 731, 851 Series of information data
122, 522, 632, 732, 852 Series of decoded information data
123 Diversity transmission timing control signal
124 Diversity reception timing control signal
125 Series of convolution-coded data
126a, 126b Series of punctured data
127a, 127b Series of demodulated data
128a, 128b, 633a, 633b Series of depunctured data
201 Reference matrix generator
202 Matrix converter
201a Reference matrix
301 Reception level memory
302 Weighting/combining unit
401 Code division multiplex signal transmitter
402 Code division multiplex signal receiver
502a, 502b, 613a, 613b, 803, 813 Puncturing pattern generator
504a, 504b, 601 Transmission controller
505a, 505b, 602 Modulator/transmitter
511, 611a, 611b Reception controller
512, 612a, 612b Receiver/demodulator
620 Output processing device
700a, 700b Satellite repeater station
710 Earth station transmission device
711 Earth station modulator/transmitter
720 Earth station receiving device
721 Earth station receiver/demodulator

What is claimed is:

1. A time-diversity transmission and reception system comprising:
   a transmission device including:
   (1) convolutional coding means for convolution-coding input data, and outputting convolution-coded data;
   (2) first multiple puncturing pattern generation means for generating puncturing patterns having an identical puncturing rate, but having respectively different puncturing block patterns, said first multiple puncturing pattern generation means providing a reference matrix from which are generated said puncturing patterns;
   (3) first puncturing means for puncturing convolution-coded data output by said first convolutional coding means by using each of said puncturing patterns supplied by said first multiple puncturing pattern generation means, and outputting punctured data;
   (4) diversity transmission timing control means for outputting a diversity transmission timing control signal for carrying out transmission for a plural number of times;
   (5) time-diversity modulation/transmission means for modulating and transmitting, as diversity transmission data, said punctured data output by said first puncturing means in response to said diversity transmission timing control signal, and
   a receiving device including:
   (1) diversity reception timing control means for outputting a predetermined diversity reception timing control signal or carrying out reception of a signal transmitted with time diversity transmission;
   (2) time-diversity reception/demodulation means for receiving and demodulating each of the signals transmitted by said transmission device, in response to said diversity reception timing control signal, and outputting demodulated data;

(3) second multiple puncturing pattern generation means for generating puncturing patterns, which are identical to the puncturing patterns generated by said first multiple puncturing pattern generation means;

(4) first depuncturing means for depuncturing the demodulated data output from said time-diversity reception/demodulation means by using the puncturing patterns supplied by said second multiple puncturing pattern generation means, and outputting depunctured data;

(5) first combining means for combining the depunctured data output by said first depuncturing means, and outputting a result of combining; and (6) first convolutional decoding means for convolution-decoding said result of combining, and outputting decoded data, wherein said time-diversity transmission and reception system executes time-diversity transmission and reception of error-correction code words, as individual diversity branch data, obtained by puncturing and convolution-coding information data with the puncturing patterns, and said first multiple puncturing pattern generation means comprises a first reference matrix generation means for generating a reference matrix for one of said puncturing patterns, and a first matrix conversion means for outputting a different puncturing pattern for each one of a plurality of diversity branches by converting at least one of rows, columns and elements of said reference matrix.

2. The time-diversity transmission and reception system according to claim 1, wherein said second multiple puncturing pattern generation means comprises second reference matrix generation means having the same function as said first reference matrix generation means, and a second matrix conversion means having the same function as said first matrix conversion means with relation to a further reference matrix generated by said second reference matrix generation means.

* * * * *